Nov. 28, 1972  S. C. HARRIER  3,704,194
PERFORATED REINFORCED PLASTIC MEMBER AND METHOD FOR MAKING
Filed July 2, 1970
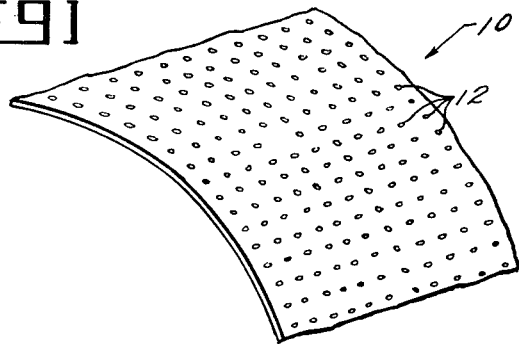
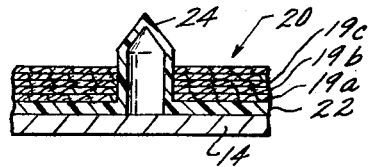
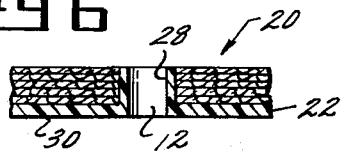
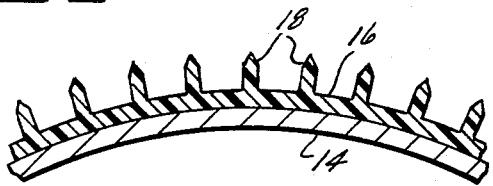
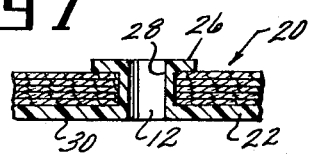
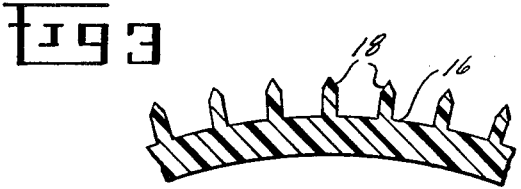
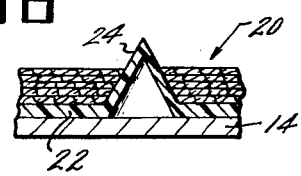
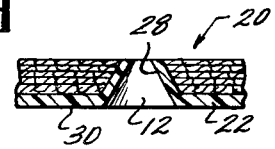
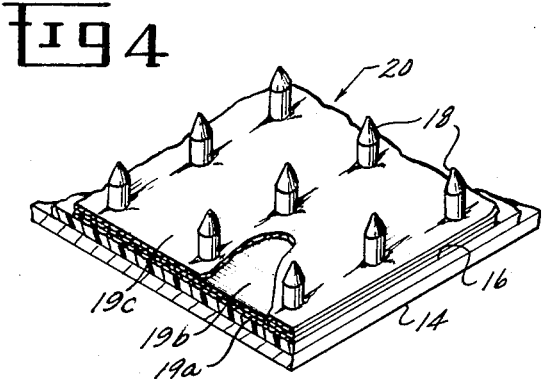
INVENTOR.
STANLEY C. HARRIER
ATTORNEY United States Patent Office 3,704,194
Patented Nov. 28, 1972

3,704,194
PERFORATED REINFORCED PLASTIC MEMBER
AND METHOD FOR MAKING
Stanley C. Harrier, Cincinnati, Ohio, assignor to
General Electric Company
Filed July 2, 1970, Ser. No. 51,991
Int. Cl. B28b 7/30; B29b 19/00
U.S. Cl. 156—245     4 Claims

ABSTRACT OF THE DISCLOSURE

Perforations in reinforced, plastic members are provided by first pressing a partially cured sheet, or series of sheets, over spaced apart, pointed, studs projecting from a mold surface portion. The sheet is then cured while pressed on the mold surface. In one form of the method, the studs are at least partially elastic and the sheet, after curing, is removed from the studs. In another form, the studs are hollow and, when the projecting tips are cut away, perforations remain.

BACKGROUND OF THE INVENTION

The manufacture of reinforced members, such as acoustic surface panels, made with plastics, requires some means for providing porosity through the panel. Reported methods of drilling or piercing holes after the sheet has been cured are costly and tend to reduce the mechanical properties of the acoustical panel system. For example, because the fibers of the reinforcing material, such as glass, are rigidly held in the cured sheet, drilling or piercing will tend to break a portion of the strands of such reinforcing material, particularly if the panel is laminated with a series of superimposed sheets.

SUMMARY

It is a principal object of the present invention to provide a method for making a perforated reinforced plastic member in which the perforations are created while the member is in a partially cured condition and in which the strands of a reinforcing material generally are made to pass around the perforation prior to curing.

Another object is to provide a perforated reinforced plastic laminated member which, in one form, can be provided with a surface of improved stability, such as to erosion, wear, etc., and a method for making such member.

These and other objects and advantages of the present invention will be more fully understood from the following detailed description which is meant to be typical of rather than limiting on the scope of the present invention.

Briefly, the present invention in one form provides a method for making a perforated reinforced plastic member from a mold by providing, to form a face of the member, a mold surface portion including spaced apart, at least partially elastic studs each pointed at its tip portion projecting from the mold surface portion. A partially cured reinforced plastic impregnated sheet, or a series of reinforced plastic sheets, is placed over the studs. Then the sheet and studs are pressed together so that the studs project through the sheet. The sheet is pressed toward the mold surface during curing of the sheet. In one form of the invention, the cured sheet is removed from the mold surface and the studs. In another form, in which are used hollow studs which can be rigid rather than partially elastic and the mold remains as a part of the member, a portion of each stud projecting through the sheet is removed, thus leaving open perforations through the sheet.

TECHNICAL DISCLOSURE OF THE INVENTION

The invention will be better understood from the following detailed description taken in conjunction with the accompanying drawing in which:

FIG. 1 is an isometric, fragmentary view of a contoured perforated plastic laminated member made according to this invention;

FIG. 2 is a fragmentary, sectional view of a mold surface portion and supporting member;

FIG. 3 is a fragmentary, sectional view of a mold including integral surface and supporting sections;

FIG. 4 is an isometric, partially sectional, fragmentary view of the structure of FIG. 2 during practice of the method of this invention; and FIGS. 5 through 9 are fragmentary, sectional views of a portion of the mold and surface portion including hollow studs in the manufacture of the laminated member of the present invention.

A present use of a perforated plastic laminated member to which the present invention relates is in the fan portion of an aircraft turbo-fan engine. Such a member is in the form of a complex contoured panel which lines the duct in which the fan portion of the engine rotates and through which air passes. It also functions as one face of a sound suppression panel. As was mentioned before, methods involving drilling or piercing of perforations in fully cured panels are very time consuming and hence costly. Because of the complex contours involved, it is difficult to hold and move the panel during such perforating step. In addition, because the network of strands of reinforcing fibers are held rigidly rather than flexibly in the fully cured sheet, systematic and patterned drilling or piercing operations will break some of such strands, reducing the mechanical properties of the panel.

The present invention involves the provision of pointed studs projecting from a mold surface portion of a mold. However, it was found that, when a contoured panel, which was to be removed from such a mold surface portion, was being produced, inflexible, rigid studs such as those made of metal, ceramic or hard plastic could not be used: once the panel was cured on such a stud, the contour of the panel locked the studs in place in the panel. In such a case, because of the relatively small size of the studs generally used and the strength of the cured panel, it was found that a large number of studs were torn from the mold surface portion, filling and blocking the relatively small perforations. For this reason, one important feature of one form of the present invention as it relates to the formation of contoured members is that the studs be of a material which provides sufficient elasticity to allow the studs to bend when the cured perforated panel is removed from the studded mold surface portion held in contoured shape.

One form of the contoured perforated plastic laminated member made according to the present invention is the panel shown generally at 10 in FIG. 1. Included through panel 10 are perforations 12 which are an acoustical requirement when such panel is used as a member of a sound suppression structure.

The contoured perforated panel 10 of FIG. 1, according to one form of the method of this invention, was made using mold supporting member 14 of FIG. 2, supporting mold surface portion 16 from which a plurality of tip pointed studs 18 project. Studs 18 are made from a partially elastic material such as polyurethane to enable the cured panel to be stripped from the studs after curing. Although it has been found to be preferred to use the mold surface portion 16 with the supporting member 14 as shown in FIG. 2 because a thinner mold can be used, a single, heavier or integral mold unit as shown in FIG. 3 can be used.

During practice of such form of the present invention, mold surface portion 16 and its projecting studs 18 were first treated with an ordinary, compatible mold release agent which substantially did not affect the material either of the mold surface portion or of the sheet or layers subsequently applied. Then, as shown in FIG. 4, sheets 19a, 19b, 19c, etc., of a fabric, such as glass cloth, which had been preimpregnated with a resin such as an epoxy and partially cured, were pressed successively onto studs 18 toward mold surface portion 16 until a body of a plurality of laminations 20 were deposited on mold surface portion 16 with studs 18 projecting through the laminations.

Because the resin which impregnates the cloth or fabric was in the partially rather than fully cured condition, strands of the fabric were not held rigidly. When the fabric was pressed over the pointed studs, such strands were pushed aside rather than severed and the structural integrity and mechanical strength of the fabric was maintained.

The superimposed layers of preimpregnated, partially cured fabric, which together form the laminated structure, were pressed toward mold surface portion 16 while the laminated structure was cured, for example, by heating. After curing, the laminated structure was pulled from mold surface portion 16 and from studs 18. Because studs 18 were at least partially elastic, they flexed as the cured, contoured sheet was removed. This allowed each stud to be slipped from the perforation it formed around its periphery, avoiding tearing of the studs from mold surface portion 16 as would have been the case were the studs inflexible.

In one specific example of this form of the invention, the supporting member 14 was made of aluminum, although it can be made of any sufficiently strong, stable material. The mold surface portion 16 and studs 18 were made of polyurethane plastic in order to resist dimensional change and remain stable at the 300° F. curing temperature used. The mold was secured, such as through a cement, to supporting member 14, as shown in FIG. 2, after which a mold release agent, such as polyvinyl alcohol, was applied such as by spraying over mold surface portion 16 and studs 18.

After curing of the mold release agent, several successive layers of eight harness satin weave glass fabric, impregnated with an epoxy resin of the type commonly used in the art, were pressed successively over studs 18 toward mold surface portion 16. The laminations were covered with a plastic film, such as a polytetrafluoroethylene, after which the laminations were compacted under pressure for example, with a vacuum bag, autoclave, matching mold, etc., according to methods commonly used in the art. In this example, a vacuum bag was used. At the same time, heat for curing was applied at a temperature compatible with the polyurethane mold and studs and with the laminated impregnated cloth. In this example, about 300° F. was used for about two hours under pressure of about 50 p.s.i.

After curing, the pressure was relieved from the laminated material. The laminated structure, in the form of the panel of FIG. 1 was pulled from the mold surface portion 16 and studs 18, thus leaving a plurality of perforations 12 corresponding with the positioning of studs 18.

Another form of the present invention, in which the mold becomes a part of the member, can be used to provide a perforated or reinforced plastic laminated member having a face and perforation lining of improved stability such as to erosion, wear, etc., compared with that of the material of the remainder of the member. In an application in which air borne particles are carried at a relatively rapid rate over the surface of such a member, and frequently into the perforations of such a member, deterioration of surfaces contacted can occur. The present invention can provide an improved surface on such a member and in such perforations through the use of a back face portion of the mold and including at least a lower portion of each stud, which becomes a more stable fluid contact face of the member being formed. This was accomplished through the use of a mold of a selected material having the desired fluid resistant characteristics and shaped substantially the same as the mold shown in FIG. 2 except that the studs were hollow to a point above that at which they were intended to project above the sheets pressed over the studs. Such studs were open through back face portion 30, toward supporting member 14 as shown in FIGS. 5–8. One such mold 22 with hollow stud 24 is shown in one form in FIG. 5 and in another form in FIG. 8.

In this form of the present invention, the material of mold 22 and studs 24 can be selected from a variety of plastics having the characteristics desired, or from metals.

One method of making mold 22 and hollow studs 24 is to deposit, such as through electrolytic or electroless means, a metal, for example, copper, nickel, cobalt or their alloys, on an appropriately shaped mandrel. When such deposit is removed from the mandrel, it provides mold 22 and hollow studs 24. This structure, which becomes part of the member being made, can be used in cooperation with supporting member 14, or alone if its strength is adequate, in the formation of the perforated, laminated member.

The method described in connection with the example above was repeated except that no mold release agent was first applied to mold 22 and studs 24. In addition, after curing, the completed laminated body was not stripped from such mold and studs. Rather, the tip portion of each stud 24 was removed, such as by disk grinding, to open perforations 12 as shown in FIGS. 6 and 9. Alternatively, tip 24 can be opened and pressed onto laminated body 20 to provide a locking member 26 as shown in FIG. 7. Such a locking member will hold mold 22 in contact with laminated body 20. As a result, during use of the perforated member thus formed, mold 22 will not separate from the laminated body 20. After tip portion 24 was removed, there remained in perforation 12 a perforation liner 28. Such liner, in cooperation with face fluid contact 30 of the perforated member, protected the member from erosion, wear, etc., such as might result from impingement or abrasion of fluid or airborne particles.

What is claimed is:

1. In a method for making a rigid, contoured, perforated, reinforced plastic member, the steps of:
   providing a contoured mold having a mold back face portion and a mold surface portion including spaced apart studs each pointed at its tip portion integral with and projecting from the mold surface portion, the studs being sufficiently elastic to allow removal of the rigid, contoured member after curing;
   covering the mold surface portion with a mold release agent which substantially will not affect material of the mold surface portion and material of a subsequently placed sheet;
   placing over the studs a sheet which is comprised of a reinforcing structure impregnated with a partially cured plastic;
   pressing the sheet and studs together so that the studs pierce and project through the sheets;
   curing the plastic in the sheet while pressing the sheet toward the mold surface portion; and then
   removing the perforated, reinforced plastic member from the mold surface portion and from the studs.

2. In a method as in claim 1 in which a series of sheets are placed over the studs and are pressed toward the mold surface portion to form a laminated structure.

3. In a method for making a rigid, perforated, reinforced plastic member, the steps of:
   providing a mold having a mold back face portion and a mold surface portion including a plurality of spaced apart studs each pointed at its tip portion projecting from the mold surface portion;

the studs including a hollow interior to a point above that at which they are intended to project through a subsequently applied sheet, the hollow interior being open through the mold back face portion;

placing over the studs a sheet which is comprised of a reinforcing structure impregnated with a partially cured plastic which can be bonded with the mold;

pressing the sheet and studs together so that the studs pierce and project through the sheet;

curing the plastic in the sheet while pressing the sheet toward the mold surface portion to bond together the mold and the sheet; and then removing a portion of each stud projecting through the cured sheet to open perforations in the plastic member.

4. In a method as in claim 3 in which the mold back face portion and each stud is made of a material having erosion and wear resistance to moving fluid and fluid borne particles better than that of the material of the sheets at least in that portion of the stud adjacent the mold back face portion.

References Cited

UNITED STATES PATENTS

| | | | |
|---|---|---|---|
| 142,911 | 9/1873 | Hill | 264—156 |
| 1,177,902 | 4/1916 | Schweinert | 264—156 |
| 1,266,936 | 5/1918 | Harris | 264—271 |
| 1,586,076 | 5/1926 | Dickey | 161—112 |
| 1,608,727 | 11/1926 | Dickey | 161—112 |
| 2,020,214 | 11/1935 | Rendall | 161—114 |
| 2,286,117 | 6/1942 | Sidnell | 264—154 |
| 2,424,916 | 7/1947 | Stedman | 161—112 |
| 2,712,159 | 7/1955 | Marsh | 264—316 |
| 2,752,279 | 6/1956 | Alderfer | 161—112 UX |
| 3,021,241 | 2/1962 | Schneiderman et al. | 156—173 |
| 3,302,227 | 2/1967 | Bente | 156—303.1 |
| 2,688,581 | 9/1954 | Stubbs | 161—111 |
| 2,593,456 | 4/1952 | James | 249—183 |
| 3,157,934 | 11/1964 | Williams | 25—128 |
| 3,350,250 | 10/1967 | Sanz et al. | 156—247 |

OTHER REFERENCES

Doyle, E. N., Development and Use of Polyester Products, McGraw-Hill, New York (1969), pp. 97, 98, 99, 303—306 and 324 relied on.

Randolph et al., Plastics Engineering Handbook, Reinhold, New York (1964), pp. 180, 181 relied on.

Winspear, G. G., Rubber Handbook, Vanderbilt, New York (1958), p. 195 relied on.

DOUGLAS J. DRUMMOND, Primary Examiner

U.S. Cl. X.R.

264—313, 271; 249—183; 156—303.1